United States Patent [19]

Porrmann et al.

[11] 4,397,337
[45] Aug. 9, 1983

[54] TUBULAR CASING SUITABLE FOR FOODSTUFFS AND PROCESS FOR ITS MANUFACTURE

[75] Inventors: Herbert Porrmann, Niedernhausen; Peter Heidel, Wiesbaden; Karl Stenger, Ruedesheim, all of Fed. Rep. of Germany

[73] Assignee: Hoechst Aktiengesellschaft, Frankfurt am Main, Fed. Rep. of Germany

[21] Appl. No.: 324,967

[22] Filed: Nov. 25, 1981

[30] Foreign Application Priority Data

Mar. 7, 1981 [DE] Fed. Rep. of Germany ....... 3108795

[51] Int. Cl.³ ...................... F16L 11/00; A22C 13/00
[52] U.S. Cl. ................................ 138/118.1; 138/124; 138/137; 138/151; 428/36; 426/105; 426/135; 426/140
[58] Field of Search ....................... 138/118.1; 428/36; 426/105, 135, 140, 412, 413, 414

[56] References Cited

U.S. PATENT DOCUMENTS

| | | |
|---|---|---|
| 2,138,462 | 11/1938 | Trabold . |
| 2,144,900 | 1/1939 | Smith . |
| 2,345,543 | 3/1944 | Wohnsiedler et al. . |
| 2,573,956 | 11/1951 | Daniel, Jr. et al. . |
| 2,616,874 | 11/1952 | Yost . |
| 2,653,432 | 9/1953 | Wright et al. . |
| 2,796,362 | 6/1957 | Wooding et al. . |
| 2,819,488 | 1/1958 | Gimbel . |
| 2,926,154 | 2/1960 | Keim . |
| 3,224,885 | 12/1965 | Shiner . |
| 3,369,911 | 2/1968 | Witzleben . |
| 3,378,379 | 7/1966 | Shiner et al. . |
| 3,594,857 | 7/1971 | Michl . |
| 3,619,854 | 11/1971 | Ilgen et al. . |
| 3,645,760 | 2/1972 | O'Brien et al. . |
| 3,766,603 | 10/1973 | Urbutis et al. . |
| 3,886,979 | 6/1975 | Rasmussen ........................ 138/118.1 |
| 3,935,320 | 1/1976 | Chiu et al. ............................ 426/105 |
| 3,988,804 | 11/1976 | Regner et al. . |
| 4,185,358 | 1/1980 | Regner et al. . |
| 4,195,054 | 3/1980 | Verellen et al. . |
| 4,283,426 | 8/1981 | Schenk et al. ..................... 138/118.1 |
| 4,287,217 | 9/1981 | Hammer et al. . |
| 4,356,199 | 10/1982 | Hammer et al. ..................... 426/105 |
| 4,356,200 | 10/1982 | Hammer et al. ..................... 426/105 |

FOREIGN PATENT DOCUMENTS

| | | |
|---|---|---|
| 1814590 | 7/1969 | Fed. Rep. of Germany . |
| 2829102 | 1/1980 | Fed. Rep. of Germany . |
| 2832926 | 2/1980 | Fed. Rep. of Germany . |
| 865727 | 4/1961 | United Kingdom . |
| 908205 | 10/1962 | United Kingdom . |

*Primary Examiner*—William R. Dixon, Jr.
*Attorney, Agent, or Firm*—Schwartz, Jeffery, Schwaab, Mack, Blumenthal & Koch

[57] ABSTRACT

Disclosed is a tubular casing comprising a fiber-reinforced regenerated cellulose wherein the fiber-reinforcement comprises a fiber web comprising first and second edge regions, parallel to the longitudinal axis, which are overlapped and bonded to form a tube; an impregnation layer of a thermoplastic synthetic resin applied on the entire inwardly-facing surface of the fiber-reinforcement and present in a weight per unit area of less than about 50 g/m², the impregnation layer comprising the bond for the edge regions; and a regenerated cellulose surface on the outer surface of the fiber-reinforcement. Also disclosed is a process for manufacturing the tubular casing.

15 Claims, 2 Drawing Figures

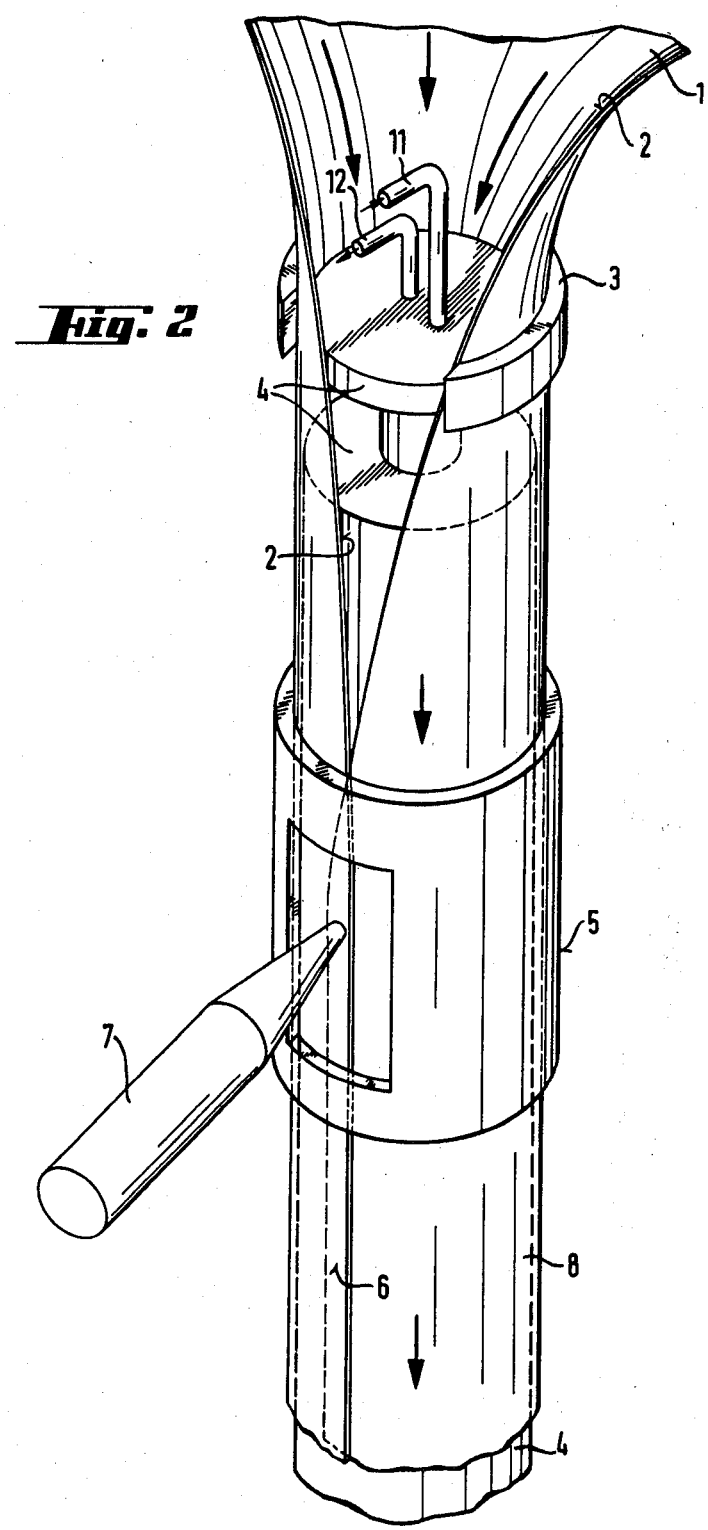

TUBULAR CASING SUITABLE FOR FOODSTUFFS AND PROCESS FOR ITS MANUFACTURE

BACKGROUND OF THE INVENTION

The present invention relates to an improved tubular casing, and more especially to a tubular casing for foodstuffs, especially sausages, which is composed of fiber-reinforced regenerated cellulose wherein a web of fibrous material is curved longitudinally to form the tube and the edges are bonded together. The present invention also relates to a process for the manufacture of such casings.

Tubes of this type, composed of fiber-reinforced regenerated cellulose, are customarily manufactured (see, e.g., U.S. Pat. Nos. 2,144,900, 3,224,885, 3,645,760 and 4,195,054) by the following essential process steps. A web of non-woven fiber is formed into a tube, its edges are overlapped and then glued with viscose. After coating of the entire tube surface with viscose, on one side or on both sides, for example, from annular slot dies, the viscose is coagulated and regenerated to give cellulose hydrate gel, and the product is dried. During this process, the tube is supported by the gas mixture formed during the coagulation and regeneration and, during drying, it is supported by an enclosed volume of air, which has been introduced. If appropriate, the tube is stretched in the longitudinal and transverse directions in order to improve the mechanical properties.

In this procedure, some disadvantages must be accepted. In particular, this process is very cost-intensive. Moreover, the internal coating of such a tube is very involved and expensive to carry out.

A further essential disadvantage of this process is the discontinuous course of production, caused by the accumulation of gases and liquids in the interior of the tube during the regeneration stage. These must be removed from the interior of the tube at certain intervals. For this purpose, the tube is cut open and the cutting points are removed after the tube has run through the wet section. The tube ends formed by the cutting-open are then joined together again, for example, by means of viscose and subsequent action of heat (German Offenlegungsschrift No. 1,814,590), so that a continuous tube is present again in the final drying stage. A further cause of the discontinuous nature of the process is the introduction of coating fluid into the interior of the tube before and after the drying stage. To do this, the tube is initially cut open in the same way and then is completely resealed after filling.

On the other hand, a process is also known (U.S. Pat. No. 2,653,432) in which the overlapping edges of a film which is curved into the shape of a tube and which, for example, can also be composed of regenerated cellulose with optional fiber reinforcement, are glued together by means of a strip of thermoplastic material, which strip is located between the overlapping edges and becomes tacky on heating. Acrylate and polyvinylidene chloride are mentioned, inter alia, as examples of this thermoplastic material. This known tubular casing can also have a moisture-tight coating on the outside, with the overlapping edges then being kept free of coating and the remaining surface being kept free of thermoplastic material.

In this process, the adhesive is thus intended to be present not directly on the fiber reinforcement, but on the web surface composed of regenerated cellulose, and, for this reason, it is not used for gluing the overlapping edge zones of the fiber reinforcement. Moreover, the strength of an overlapping seam formed by sealing of the superposed edge zones of regenerated cellulose is comparatively low and is also completely unsatisfactory for reasons of appearance.

SUMMARY OF THE INVENTION

It is therefore an object of the present invention to provide an improved fiber-reinforced tubular casing which is composed of regenerated cellulose and does not have the disadvantages of the known tubular casings.

It is another object of the invention to provide such a tubular casing which has optimum mechanical properties.

A further object of the invention resides in providing a tubular casing and, in particular, a glued seam thereof which can withstand relatively severe mechanical and thermal stresses, for example, elongation stresses, and the action of hot water.

Still another object of the invention is to provide such a tubular casing wherein the seam does not impair the flavor and appearance of the encased foodstuff.

It is a further object of the invention to provide a straight, essentially curvature-free and fold-free casing which has a seam in the fiber reinforcement and which, even under the action of water and on shrinking, retains its curvature-free form even in the seam region, in spite of the relatively large thickness of the casing in this region.

Finally, it is also an object of the invention to provide a continuous process for manufacturing such a tubular casing and which enables the casing to be coated on its inside.

In accomplishing the foregoing objects, there has been provided in accordance with the present invention a tubular casing comprising a fiber-reinforced regenerated cellulose wherein the fiber-reinforcement comprises a fiber web comprising first and second edge regions, parallel to the longitudinal axis, which are overlapped and bonded to form a tube; an impregnation layer of a thermoplastic synthetic resin applied on the entire inwardly-facing surface of the fiber-reinforcement and present in a weight per unit area of less than about 50 g/m$^2$, this impregnation layer comprising the bond for the edge regions; and a regenerated cellulose surface on the outer surface of the fiber-reinforcement. In a preferred embodiment, the tubular casing further comprises an adhesion-promoting layer for anchoring the thermoplastic impregnation layer to the fiber web, and a gas-impermeable layer comprising the vinylidene resin on the inside surface of the tubular casing.

In accordance with another aspect of the present invention, there has been provided a process for the manufacture of a tubular casing comprising a fiber-reinforced regenerated cellulose comprising the steps of providing a fiber web; coating one of the sides of the fiber web with a thermoplastic synthetic resin to form a thermoplastic surface; shaping the fiber web in the form of a tubular casing wherein the edge regions of the fiber web are overlapped; bonding the overlapped edge regions by means of the thermoplastic surface under the action of heat and/or pressure to the overlap zone to form the tubular casing; and applying a layer of regenerated cellulose to the outer surface of the tubular casing. The process may also comprise the steps of applying a gas-impermeable layer comprising a vinylidene polymer to the thermoplastic impregnation layer, and/or the step of applying an adhesion-promoting layer for anchoring said gas-impermeable layer to the thermoplastic impregnation layer.

In a further aspect of the process, the tubular casing can be shirred and subsequently filled with a filling comprising a foodstuff, preferably a sausage emulsion. Thereafter, the filled casing may be subjected to the action of heat and/or water.

Further objects, features and advantages of the present invention will become apparent from the detailed description of preferred embodiments which follows, when considered in light of the attached figures of drawing.

BRIEF DESCRIPTION OF THE DRAWINGS

In the drawings:

FIG. 2 is an isolated perspective view illustrating the shaping of the tube and the formation of the seam of the fiber reinforcement.

DETAILED DESCRIPTION OF PREFERRED EMBODIMENTS

Figure 1:
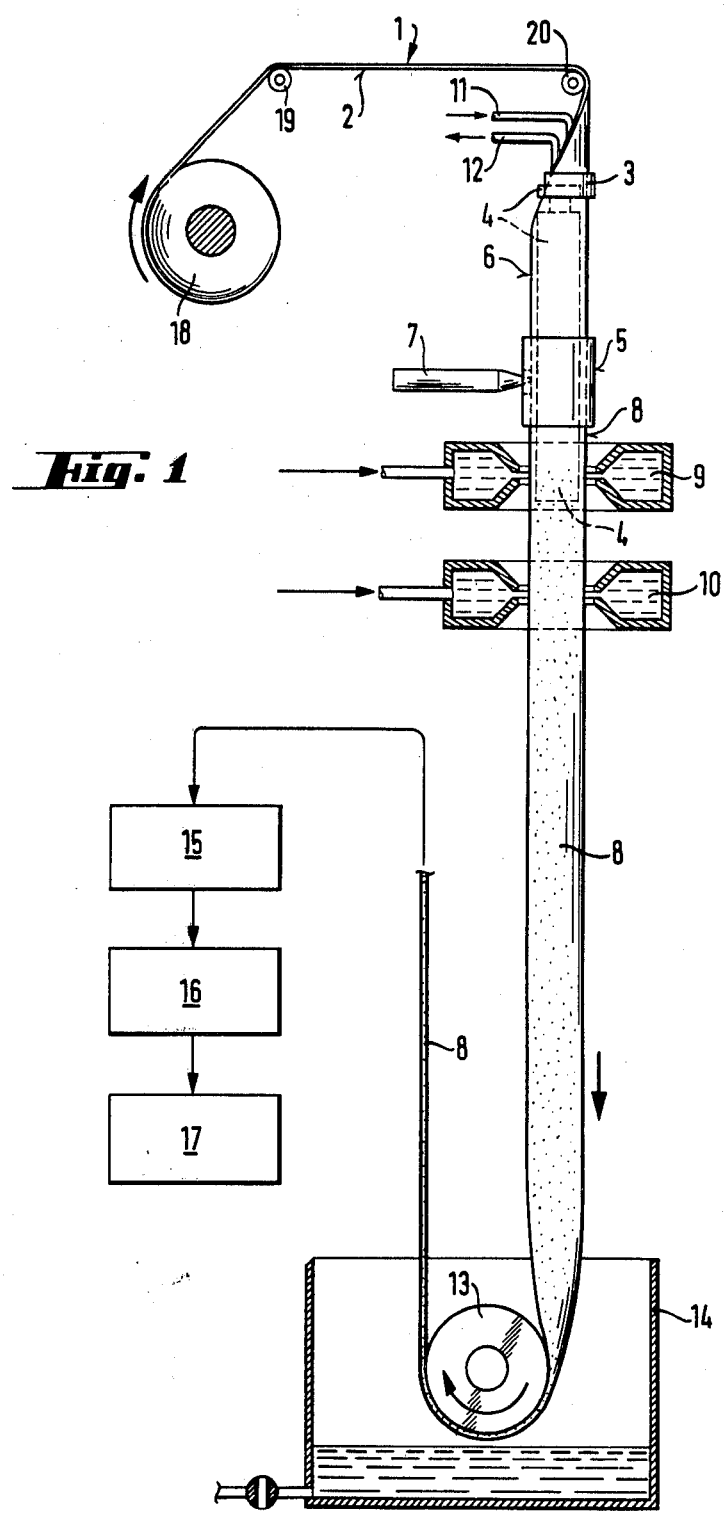
FIG. 1 is a schematic view illustrating the manufacture of the tubular casing according to the present invention.

The casing according to the present invention has the advantage that, on the one hand, it can be manufactured by a continuous process and, on the other hand, even under the action of heat and water, such as is the case, for example, when sausage casings are boiled and then cooled, it retains its straight, curvature-free form and has an adequate seam strength. This is particularly surprising and not forseeable, since it would normally be expected that, under the action of heat and water, the casing would assume a curved shape, expand unevenly or shrink, and even tend to burst, because of the different wall thicknesses in the seam region of the fiber tube, on the one hand, and in the remaining regions, on the other hand, and because of the different values of the strength, the water absorption capacity and the water retention capacity which would be expected due to these differences.

The fiber reinforcement is a sheet-like or web-like rectangular cut piece, and in particular it is in the form of a web, for example, the form of a paper web. Usually, it is composed of fibers, such as are used in the manufacture of paper or rice paper, or of natural fibers, such as hemp fibers or flax fibers, or synthetic fibers, such as polyamide, polyester and polyacrylonitrile fibers. For example, the fiber reinforcement in the form of a web is a textile structure, such as an adhesively, mechanically or thermally consolidated non-woven fiber of spun fibers, filaments or multiple filament yarns of a natural or synthetic material, which are deposited randomly or in ordered fashion, a woven fabric, network, lattice, knitted fabric or the like. Preferably, the fiber web is a paper non-woven fiber web with, in particular, a weight per unit area of from about 17 to 27 $g/m^2$. For simplicity, instead of "sheet-like or web-like pieces" and "continuous webs", only webs or fiber webs are referred to in the following text.

The adhesive used is a material system based on a thermoplastic synthetic resin which sets under the action of heat without a chemical reaction. These include hot-melt adhesives which are free from solvent, as well as heat-sealing adhesives, the solvent of which is, however, allowed to escape already before gluing. An essential condition is that this material system is physiologically acceptable. For simplicity, instead of "layer and/or impregnation" containing adhesive, only "layer" or "adhesive layer" is referred to in the following text.

The layer containing adhesive is applied either directly in the form of an emulsion, dispersion or solution, for example, in water, hydrocarbon of boiling range 65° to 95° C., acetone, ethyl acetate, toluene, chlorinated hydrocarbons or in solvent mixtures, for example, acetone/hydrocarbon, e.g., gasoline, or as a melt, to the whole area of one of the two surfaces of the fiber web, using conventional extrusion devices. The adhesive layer is present in a quantity of less than about 50 $g/m^2$, preferably from about 5 to 50, in particular from about 5 to 20 $g/m^2$, so that the fiber web is not completely penetrated by the adhesive. The opposite surface of the fiber web is thus still fully absorbent.

After application, the dispersing agent or solvent which may have been used is removed, for example, by heating with hot air.

Hot-melt adhesives are non-curing, fusible thermoplastic resins which are solid at room temperature and which are temporarily melted during the bonding process, without suffering any chemical change. After cooling and solidification, they firmly adhere to the surface of the fiber web. The polymeric raw materials used are above all ethylene/vinyl acetate copolymers, in particular those having a vinyl acetate content of from about 18 to 40% by weight, preferably about 30%, and a melt index of from about 4 to 500, in particular from about 40 to 400. Low molecular polyethylenes, atactic polypropylenes, ethylene/acrylate copolymers, copolymers containing carboxyl groups, styrene/butadiene block copolymers and styrene/isoprene block copolymers, fusible aliphatic or aromatic polyesters, for example, those which have low branching and contain hydroxyl groups, polyurethanes, polyamide resins, in particular those having a relatively low melting point and melt viscosity, and polyaminoamides are also suitable as the base resin for the hot-melt adhesive. In addition to these resins, the adhesives usually also contain resins, such as balsamic resins, colophony derivatives, hydrocarbon resins, waxes or paraffins, oxidation stabilizers, plasticizers, pigments and/or fillers.

Those hot-melt adhesives are preferred which can be processed at relatively low temperature, for example, at a temperature between about 140° and 170° C. On the other hand, they must be resistant to boiling, insensitive to hydrolysis and sufficiently flexible.

Heat-sealing adhesives are those which, like the hot-melt adhesives, are thermally activated on bonding. They are usually applied in the form of solutions, dispersions or emulsions in water or organic solvents to the surface of the fiber web. The set, solvent-free layer should not be tacky, but should melt only during sealing as the result of the heat supplied and should solidify again on cooling.

The raw materials used are copolymers of vinyl chloride or of vinylidene chloride, in solution or in dispersion, with an addition of resins and other polymers. Copolymers of vinyl acetate and polymethacrylates, polyurethanes and polyesters, in particular ethylene/vinyl acetate copolymers, vinyl acetate/vinyl chloride copolymers, polyamides and polyethylene are also used.

For the manufacture of tubes having a substantially gas-impermeable internal coating, the sealable thermoplastic material is in particular a vinylidene resin which is present with a weight per unit area of usually from about 3 to 12 g/m². These materials include film-forming resins which are obtained by copolymerization of monomers wherein at least one component contains a vinylidene group. In general, film-forming vinylidene resins can be used which contain at least about 5% by weight, but preferably at least about 80% by weight, of vinylidene chloride in the polymerized molecule. The following may be mentioned as co-monomers: vinyl derivatives, such as vinyl chloride, alkyl acrylates or methacrylates, acrylonitrile, methacrylonitrile, styrene, unsaturated organic acids, such as itaconic acid, or mixtures of these compounds. In addition to vinylidene chloride, the copolymer can contain one to three of these monomers.

These adhesives can also contain customary waxes, for example, those based on esterified montanic acids, polyolefin waxes or those based on oxazoline, and/or customary fillers, for example, kaolin, in particular kaolin which has been rendered hydrophobic, silica or calcium carbonate (chalk) having a preferred mean grain size of from about 1 to 3 μm.

Moreover, customary additions of plasticizers, for example, esters of phthalic acid, such as dibutyl phthalate, esters of citric acid, such as tributyl acetylcitrate, or sebacic acid or of tartaric acid, such as diisobutyl tartrate, are used.

It is, however, also possible and, under certain circumstances, more advantageous for process engineering reasons, to apply a gas-impermeable layer not directly to the fiber web but to the layer of hot-melt adhesive, in which case an adhesion-promoting layer may be used, if desired, in order to anchor the gas-impermeable layer onto the hot-melt adhesive layer.

If appropriate, the adhesive layer may also be anchored on the fiber web by means of an adhesion-promoting layer. An adhesion-promoting layer is to be understood as a layer of substances or mixtures of substances, which improve the adhesion between the coating and the substrate.

The adhesion-promoting layer is composed of an essentially water-insoluble resin, preferably a cured cationic thermosetting resin which, in the uncured state, is essentially water-soluble and can be converted into the water-insoluble state by progressive condensation reaction under the action of heat (see e.g., U.S. Pat. No. 3,378,379). Polyurethane resins, nitrocellulose and other polymers known as water-insoluble anchoring agents can also be used. Preferably, the adhesion-promoting layer is applied to the fiber web across the entire width of the web, and is applied directly to the surface of the web or to the adhesive layer, if a gas-impermeable layer is to be anchored. The application is preferably carried out in an aqueous dispersion which contains up to about 25% by weight of the thermosetting resin. Subsequently, the coated web is heated to about 65° to 125° C., as a result of which the resin is cured to give its water-insoluble form and enters a durable bond with the surface of the fiber web. The resin layer has a weight per unit area of between about 30 to 300 mg/m², preferably from about 40 to 75 mg/m².

Lower aliphatic or aromatic hydrocarbons, lower alcohols or esters or mixtures of these solvents are employed as suitable solvents for the thermosetting resin. It is advantageous to use an aqueous solution or dispersion.

If desired for certain applications, an additional water-repellent resin, such as paraffin, montan wax or carnauba wax, and/or suitable thickeners, such as cellulose ether or starch, can be applied to the fiber web together with the thermosetting resin.

The fiber web can also be printed with labelings or decorative patterns before or after application of the thermosetting resin or the adhesive layer and before gluing to give a fiber tube.

The coating of thermosetting resin can, if desired, contain pigments and/or organic dyes or it can form a clear layer through which any printing or coloring of the fiber web remains clearly visible. However, it is also possible to apply a transparent organic dye, together with the resin, to the fiber web in order to impart a corresponding color to the packaging casing.

If appropriate, the coating of the thermosetting resin may contain a plasticizer for the thermosetting resin and/or a curing agent for the thermosetting resin. The thermosetting resin and the plasticizer are taken up in a suitable liquid solvent or dispersing agent, which advantageously can be evaporated off at a temperature at which at least pre-curing of the resin can start at the same time.

Examples which may be mentioned of a thermosetting resin are: urea/formaldehyde (U.S. Pat. No. 2,616,874), melamine/formaldehyde (U.S. Pat. No. 2,796,362 and 2,345,543) and phenol/ formaldehyde resins. Preferred plasticizers used for these thermosetting resins are soft, non-curing resins of the alkyd type, or dibutyl phthalate, tricresyl phosphates or dibutyl sebacate.

Curing agents which can be employed for the thermosetting resins are, for example, ammonium thiocyanate, toluene sulfonic acid, maleic acid or lactic acid. These compounds act as catalysts in the curing of the thermosetting resins.

Further examples of thermosetting resins are condensation products of polyamide-polyamines or aliphatic polyamines or of polyamides with bifunctional halohydrins or derivatives thereof, such as, for example, epichlorohydrin. Examples are described, for example, in U.S. Pat. Nos. 2,573,956 and 2,926,154 or in British Pat. Nos. 865,727 and 908,205. A particularly suitable resin is, for example, the reaction product of an aliphatic, 2,6-polyamide, ethylenetriamine and epichlorohydrin.

Possible polyamines are simple alkylenediamines or polyalkylenepolyamines, such as, for example, diethylenetriamine, triethylenetetramine, tetraethylenepentamine and the corresponding polypropylenepolyamines, and polybutylene-polyamines, such as dibutylenetriamine. To manufacture the corresponding chlorohydrin resins, the polyamines are reacted with more than one mode of epichlorohydrin per mole of polyamine. The polyamide-polyamines are condensation products of a saturated, aliphatic, dibasic acid and one of the above-mentioned polyamines. Diglycolic acid, succinic acid, glutaric acid and adipic acid are preferably used as the dibasic acid.

To make the tube, the fiber web provided with the adhesive is correspondingly bent, with an overlap of the edge regions running parallel to the longitudinal axis. That surface of the fiber web which has been provided with adhesive forms the inner surface of the tube. The fiber web is formed to give the shape of a tube, for example, either over a sufficiently long path so that distortion and formation of folds do not occur, or by deflection over a shoulder-like forming tool.

The overlapping edge zones of the fiber web are glued to one another while hot, one edge zone of the fiber web being pressed against the adhesive layer on the other edge zone.

Gluing is effected, for example, by means of a jaw or roller which is pressed onto the surface and which has been preheated to a predetermined temperature. Any other heat source, such as, for example, band-type IR radiators, high-frequency heating or hot air, can also be used for gluing. The requisite contact pressure can also be exerted by means of a stream of air or by vacuum. The temperatures and pressures applied depend largely on the material properties of the adhesive layers. The movement of the web and the gluing can take place cyclically or continuously.

The fiber tube obtained is treated on its outer surface with a viscose solution. For example, it is immersed in a viscose solution or coated with a viscose solution, for example, using slot dies, rollers or spraying devices, and the viscose solution is then converted into regenerated cellulose by introducing the fiber tube into a spinning bath or by spraying or applying a film of regenerating fluid (German Offenlegungsschrift No. 2,829,102) to its outer surface.

The viscose solution is an alkaline solution of sodium cellulose-xanthate and is usually prepared by reacting the alkali cellulose, which has been obtained from cellulose and sodium hydroxide solution, with carbon disulfide in an alkaline medium. In most cases, it still contains 4 to 20% by weight of cellulose. After ripening, the viscose is applied to the fiber web and spun, that is to say, coagulated. The spinning bath contains, for example, sulfuric acid and also sodium sulfate and/or ammonium sulfate.

In further stages, the fiber-reinforced web-like product comprising a viscose gel is regenerated to cellulose hydrate gel in an acid medium, for example, in dilute (less than/equal to 5% by weight) sulfuric acid, and the cellulose hydrate gel is washed with water to remove acid and salts, desulfurized, for example with sodium sulfite solution, if appropriate passed through a bleaching bath, and finally passed through a conventional softening bath containing, for example, from about 5 to 20% strength glycerol solution.

The cellulose hydrate gel on the outer surface of the fiber tube is converted into regenerated cellulose by intensive drying at 90° to 140° C. and, if appropriate, adjusted to a water content of about 5 to 15% by weight by remoistening. After drying, the fiber-reinforced cellulose hydrate tube has a thickness of from about 50 to 200 μm, corresponding to a weight per unit area of from about 50 to 250 g/m$^2$.

For packaging meat products in the form of sausage compositions, shirred, seamless tubular casings are used, as is known, which progressively unfold as the sausage composition is forced in. The shirred casings, also called sticks or hollow rods in the trade, have hitherto been manufactured from long, seamless tubes which are conveyed in the direction of their longitudinal axis and are shirred against an opposing force, the length of the shirred casing usually being only about 1 to 3% of the original length.

The tubular casing according to the invention can also be shirred. This is particularly surprising since, because of the thickening in the sealing region of the overlapping edges, difficulties were to be expected during shirring. The tubular casing is shirred, for example, by the process known from U.S. Pat. Nos. 3,988,904 and 4,185,358, and by means of the equipment described therein. The disclosure of these patents is incorporated herein by reference. A shirring ratio of 1:70 to 1:80 can readily be achieved.

A helical twisting of the casing and, consequently, twisting of the relatively thick seam zone about the longitudinal axis of the casing during the shirring process are also possible, but not necessary. This is effected, for example, by shirring devices known per se, such as are described, for example, in U.S. Pat. Nos. 2,819,488, 3,619,854, 3,594,857 and 3,766,603. The number of turns per 10 m of tube length is appropriately between 0.5 and 10, and is chosen according to the degree of thickening in the seam zone.

The invention is now explained in more detail by reference to FIGS. 1 and 2, and to the examples which follow.

A web-shaped, long-fibered non-woven fiber web 1 which has, on one surface, a layer 2 of a polymer, which has been applied by extrusion, is continuously drawn off a roll 18 and formed into the shape of a tube, using a ring segment 3, a support element 4 and a guide sleeve 5. The polymer-coated surface is in the cavity of the tube and in the overlap seam 6. The overlapping edge zones of the fiber web 1 are welded to one another by means of an ultrasonic sealing apparatus 7.

The fiber tube 8 obtained is then coated, in accordance with the state of the art, on its outside with a viscose solution through a ring slot die 9, a homogeneous closed film of viscose being formed. The precipitant which is required for coagulation and regeneration and which contains sulfuric acid, ammonium sulfate and sodium sulfate in the customary concentrations, is applied in the form of a film by means of a circular ring slot die 10 to the outer viscose-coated surface of the fiber tube 8, using the arrangement shown in German Offenlegungsschrift No. 2,829,102.

During the application of viscose and the subsequent coagulation and regeneration stage, support air which prevents shrinking and the formation of folds in the tube 8 is introduced under a slight excess pressure into the fiber tube through the line 11.

Reference numeral 12 marks the outlet for the support air. After deflection of the tube by means of the roller 13, which is located in the trough 14 provided as a receiver for the precipitant running off, the tube runs through conventional washing baths 15, plasticizer baths 16 and a drying device 17. Further rollers 19 and 20 are used for deflecting the fiber web.

EXAMPLE 1

A web-shaped, long-fibered non-woven fiber web of hemp paper having a laid-flat width of 204 mm and a weight per unit area of 22 g/m$^2$, which has, on one surface, a layer of high-pressure polyethylene (density 0.918 g/cm$^2$, melt index 6-8, melting point 108° C.), which has been applied by extrusion (extrusion temperature 290° to 310° C.) and has a weight per unit area of 25 g/m$^2$, is continuously drawn off a roll and formed into the shape of a tube, using the apparatus illustrated in FIGS. 1 and 2. The tube has a diameter of about 63 to 64 mm, and the overlapping width is about 4 mm. The polyethylene-coated surface is in the cavity of the tube and in the overlap seam. The overlapping edge zones of the fiber web are welded to one another by means of the ultrasonic sealing apparatus.

The fiber tube obtained is then coated on its outside with a viscose solution as described above and regenerated.

The resulting fiber-reinforced casing of regenerated cellulose has a water vapor permeability of 10 g/m².d (according to DIN 53,122), and the values for the breaking strength and elongation at break can be seen in the table which follows:

|  | Breaking force (N/15 mm) | Elongation at break (%) |
| --- | --- | --- |
| Wet specimen in the |  |  |
| longitudinal direction | 43 | 14 |
| transverse direction | 37 | 22 |
| dry specimen in the |  |  |
| longitudinal direction | 75 | 7 |
| transverse direction | 61 | 12 |

The finished, wet tube has a bursting pressure of 0.9 bar.

The measurement of the breaking strength and of the elongation at break is carried out by means of an electronic tensioning device according to DIN 53,455. The breaking strength is understood as the resistance of the specimen to the tensile stress at the moment of breaking. It is measured as the breaking force (N), relative to the cross section (mm²). The elongation at break is the percentage lengthening of the specimen, as compared with the original length, under the load at the moment of breaking, and is stated in percent. The specimen has a length of 100 mm, a width of 15 mm and a thickness of 100 to 110 μm.

The wet specimen was soaked for 30 minutes in water at 40° C., and the dry specimen has a residual moisture content of 8 to 10% by weight of water and contains 20 to 24% by weight of glycerol.

EXAMPLE 2

The web-like, non-woven fiber used in Example 1, with a polyethylene coating applied by extrusion coating is coated, on top of this polymer layer, with the water vapor-impermeable and gas-impermeable copolymer, dissolved in tetrahydrofuran/toluene (7:3), which is known from German Offenlegungsschrift No. 2,832,926 and contains vinylidene chloride units. The solution also contains 1 to 2% by weight of fillers (chalk which has been rendered hydrophobic) and waxes (esterified montan waxes) and also 5 to 10% by weight of plasticizer (dibutyl phthalate and citric acid ester). The thickness of this coating corresponds to a weight per unit area of 5 g/m². To improve the adhesion between the layers of polyethylene and the gas-impermeable copolymer, a conventional adhesion-promoting resin, for example, a two-component adhesive based on polyurethane or a resin mixture based on polyester and isocyanate, is applied to the polyethylene layer by means of screen rollers, before the coating with the copolymer.

Shaping into a tube and formation of the tube as well as the regeneration are carried out as described in Example 1.

In the wet state, the finished tube shows a bursting pressure of 0.8 bar, a water vapor permeability of 1 to 2 g/m².d (DIN 53,122) and a weight per unit area of 105 g/m². The breaking strength and the elongation at break are indicated in the table which follows.

|  | Breaking force (N/15 mm) | Elongation at break (%) |
| --- | --- | --- |
| Wet specimen in the |  |  |
| longitudinal direction | 55 | 12 |
| transverse direction | 51 | 20 |
| dry specimen in the |  |  |
| longitudinal direction | 76 | 6 |
| transverse direction | 63 | 11 |

For comparison, the values for the breaking force and elongation at break of a conventional fiber-reinforced tubular casing of regenerated cellulose with a polyvinylidenechloride (PVDC) coating on the inside are given. The tubular casing is manufactured by bonding the tube-shaped fiber web with viscose, coating with regenerated cellulose and applying the PVDC layer to the inside.

|  | Breaking force (N/15 mm) | Elongation at break (%) |
| --- | --- | --- |
| Wet specimen in the |  |  |
| longitudinal direction | 28 | 17 |
| transverse direction | 23 | 17 |
| dry specimen in the |  |  |
| longitudinal direction | 72 | 6 |
| transverse direction | 70 | 11 |

What is claimed is:

1. A tubular casing comprising a fiber-reinforced regenerated cellulose wherein the fiber-reinforcement comprises:
    a fiber web comprising first and second edge regions, parallel to the longitudinal axis, which are overlapped and bonded to form a tube;
    an impregnation layer of a thermoplastic synthetic resin applied on the entire inwardly-facing surface of said fiber-reinforcement before overlapping said edge regions, and present in a weight per unit area of less than about 50 g/m², said impregnation layer comprising the bond for said edge regions; and
    a regenerated cellulose surface on the outer surface of said fiber-reinforcement applied after overlapping and bonding said edge regions.

2. A tubular casing as defined in claim 1, wherein said thermoplastic impregnation layer comprises a hot-melt adhesive or a heat-sealable material.

3. A tubular casing as defined in claim 1, wherein said thermoplastic comprises a polymer or copolymer comprising ethylene and/or propylene or vinylidene chloride.

4. A tubular casing as defined in claim 1, wherein said thermoplastic comprises a polyamide.

5. A tubular casing as defined in claim 1, wherein said thermoplastic is present on said fiber-reinforcement in an amount from about 5 to 50 g/m².

6. A tubular casing as defined in claim 5, wherein said thermoplastic is present on said fiber-reinforcement in an amount from about 5 to 20 g/m².

7. A tubular casing as defined in claim 1, wherein said fiber web comprises a non-woven paper fiber web comprising a weight per unit area from about 17 to 27 g/m².

8. A tubular casing as defined in claim 1, wherein said thermoplastic impregnation layer comprises a continuous layer.

9. A tubular casing as defined in claim 1, wherein said thermoplastic impregnation layer comprises a discontinuous impregnation.

10. A tubular coating as defined in claim 1, further comprising an adhesion-promoting layer for anchoring said thermoplastic impregnation layer to said fiber web.

11. A tubular casing as defined in claim 1, further comprising a gas-impermeable layer comprising a vinylidene resin on the inside surface of said tubular casing.

12. A tubular casing as defined in claim 11, further comprising an adhesion-promoting layer for anchoring said gas-impermeable layer to said thermoplastic impregnation layer.

13. A tubular casing as defined in claim 11, wherein said layer of vinylidene resin comprises a weight per unit area of about 3 to 12 g/m².

14. A tubular casing as defined in claim 12, wherein said adhesion-promoting layer comprises a water-insoluble resin.

15. A tubular casing as defined in claim 1, which has been shirred.

* * * * *